Patented June 5, 1945

2,377,593

UNITED STATES PATENT OFFICE 2,377,593

ETCHING INK

Donald L. Vande Bunte, Detroit, Mich., assignor to Packard Motor Car Company, Detroit, Mich., a corporation of Michigan No Drawing. Application February 9, 1942, Serial No. 430,073

3 Claims. (Cl. 41—41)

This invention relates to improvements in etching ink and the process of making the same.

In the manufacture of devices made up of metal parts, it is desirable to apply a mark to indicate various things, such as identity, inspection and quality. This marking has been done with etching ink that is usually applied by means of a rubber stamp having a suitable design. The inks that are available for etching steel, brass and bronze work pieces have been found inadequate because the etched design has not been clear or permanent. The etched design has been dull and rubs off when the work piece is handled.

It is an object of this invention to provide an etching ink that will leave a permanent mark on metal, such as steel, brass and bronze.

Another object of the invention is to provide an ink that can be used to mark metal with a design of clean outline and colored to be readily discernible.

Another object of the invention is to provide an etching ink that can be applied to metals, such as steel, brass or bronze, to produce a clear cut design having a readily discernible color.

An ink having the desirable characteristics referred to for general use in etching work pieces or rough stock formed of metal, such as steel, brass or bronze, can consist of a solution containing molybdic acid, a trace of mercuric chloride, copper sulphate, antimony trichloride, hydrochloric acid, nitric acid, a trace of sulphuric acid and water. If the ink is to be used only for etching steel, the antimony trichloride can be eliminated from the general use formula, and if the ink is to be used only for etching brass or bronze, the mercuric chloride can be eliminated from the general use formula.

The ink solution is made up of two mixtures, the molybdic acid being dissolved in a portion of the hydrochloric acid as one of the mixtures. The other mixture is made by adding the water to the nitric acid, the remainder of the hydrochloric acid and the sulphuric acid, and then the antimony chloride, copper sulphate and mercuric chloride are added. The mixtures are warmed, if necessary, and stirred until into solution and are then poured together and thoroughly stirred. Separate mixing of the molybdic acid and hydrochloric acid is necessary to provide a clear solution, as otherwise an undesirable residue would be present.

The molybdic acid, mercuric chloride, copper sulphate and antimony trichloride in their chemical reaction on steel, brass and bronze have the effect of producing a dark black color that is readily discernible. The water serves to dilute the solution without reducing the etching effect upon the metal and, in addition, tends to eliminate fumes that would otherwise arise from the solution.

The following formula can be used for making one gallon of ink:

| | | |
|---|---|---|
| Molybdic acid, powder | grams | 437 |
| Mercuric chloride, powder | do | 23 |
| Copper sulphate, crystal | do | 100 |
| Antimony trichloride, crystal | do | 585 |
| Hydrochloric acid, concentrated | milliliters | 2,450 |
| Nitric acid, concentrated | do | 530 |
| Sulphuric acid, concentrated | do | 80 |
| Water | do | 360 |

What I claim is:

1. An ink solution comprising water, molybdic acid, mercuric chloride, copper sulphate, antimony trichloride, hydrochloric acid, sulphuric acid, and nitric acid.

2. An ink solution comprising water, molybdic acid, mercuric chloride, copper sulphate, hydrochloric acid, sulphuric acid, and nitric acid.

3. An ink solution comprising water, molybdic acid, copper sulphate, antimony trichloride, hydrochloric acid, sulphuric acid, and nitric acid.

DONALD L. VANDE BUNTE.